United States Patent [19]

Love

[11] Patent Number: 5,110,178
[45] Date of Patent: May 5, 1992

[54] T-TOP ROOF COVER

[76] Inventor: Natalie R. Love, 3604 Telmar Rd., Baltimore, Md. 21207

[21] Appl. No.: 627,321

[22] Filed: Dec. 14, 1990

[51] Int. Cl.⁵ .............................................. B60J 7/10
[52] U.S. Cl. ..................................... 296/218; 296/136
[58] Field of Search ....................... 296/218, 219, 136

[56] References Cited

U.S. PATENT DOCUMENTS

| | | | |
|---|---|---|---|
| 4,290,640 | 9/1981 | Dalton | 296/216 X |
| 4,475,764 | 10/1984 | Hutchinson et al. | 296/219 X |
| 4,639,035 | 1/1987 | Isaacson | 296/219 X |
| 5,009,465 | 4/1991 | Induni | 296/219 |

FOREIGN PATENT DOCUMENTS

| | | | |
|---|---|---|---|
| 282243 | 4/1952 | Switzerland | 296/219 |
| 268282 | 5/1927 | United Kingdom | 296/219 |

OTHER PUBLICATIONS

J. C. Whitney & Co. No. 4678, Copyright Feb. 1986, p. 76, Item: "Custom-fit Rain Top".

*Primary Examiner*—Johnny D. Cherry
*Assistant Examiner*—Gary C. Hoge
*Attorney, Agent, or Firm*—William E. Mouzavires

[57] ABSTRACT

A removable cover for a T-top automobile roof having seals along its front and rear edges for engagement with the automobile frame, and seals along its opposite side edges for engagement with the side windows of the automobile. Removable fastener elements are provided for releasably attaching the cover to the frame of the automobile. In one embodiment the fasteners are male and female snaps. The female snaps are provided on the front edge of the cover and have tabs requiring the front portions of the female snaps to be engaged prior to rear portions so that the male and female snaps are interlocked. In addition, fasteners are provided at the four corners of the cover so as to attach to the frame of the automobile at a level below the upper edge of the automobile windows. This promotes establishment of a seal between the side edges of the cover and the side windows of the automobile.

15 Claims, 6 Drawing Sheets

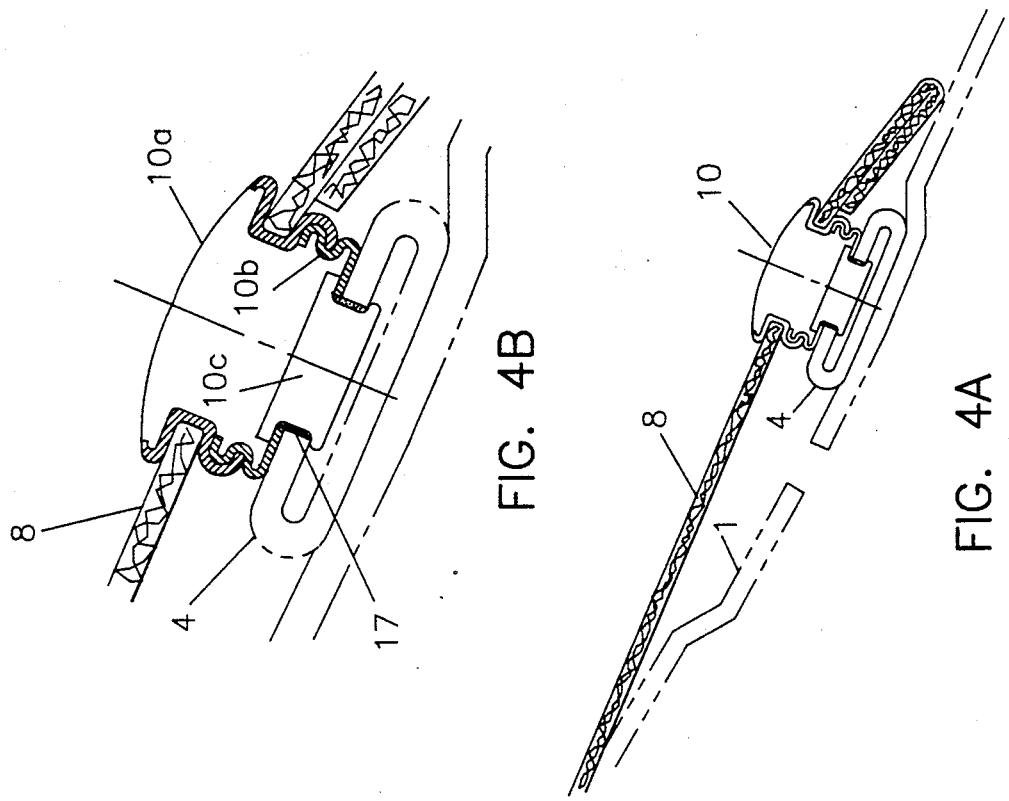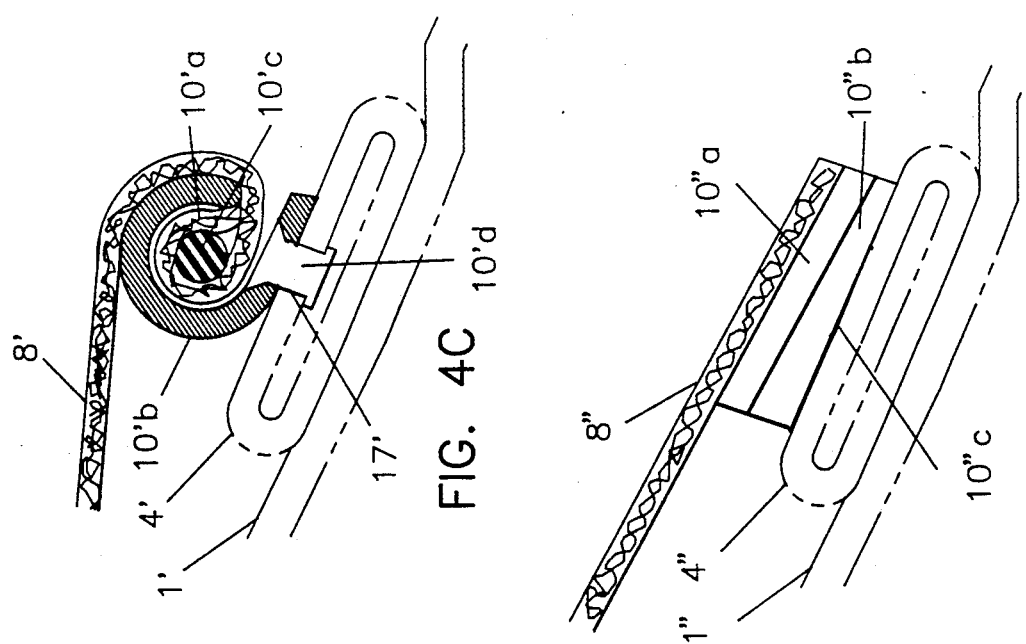

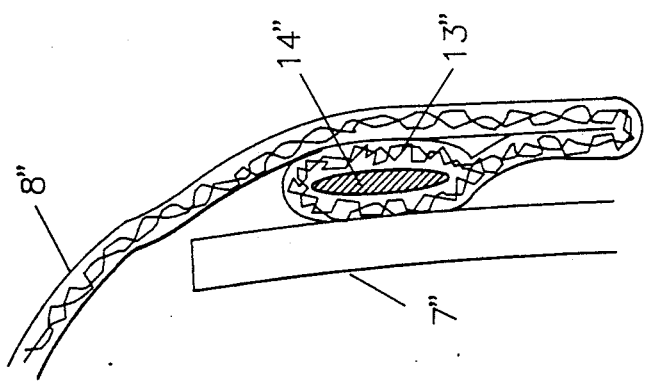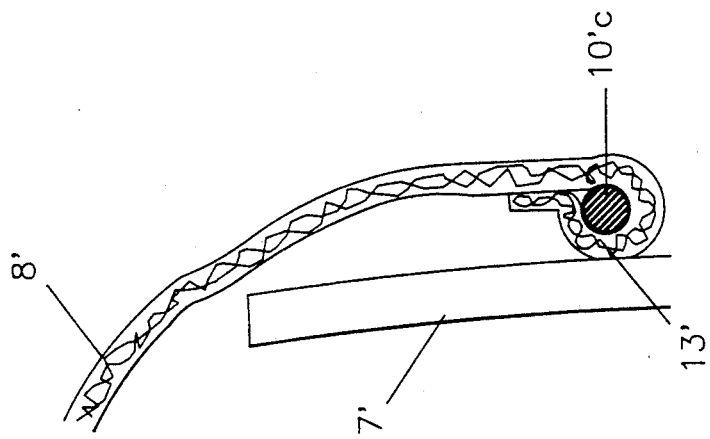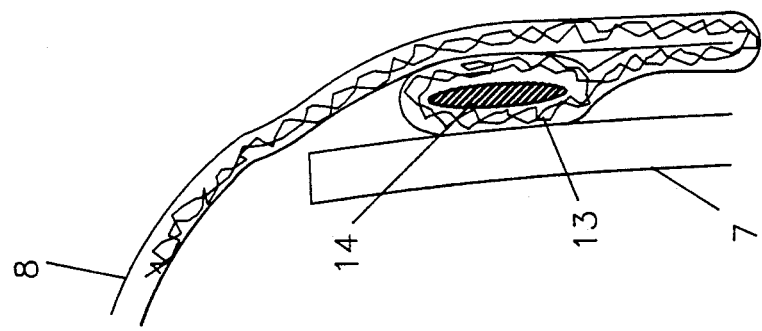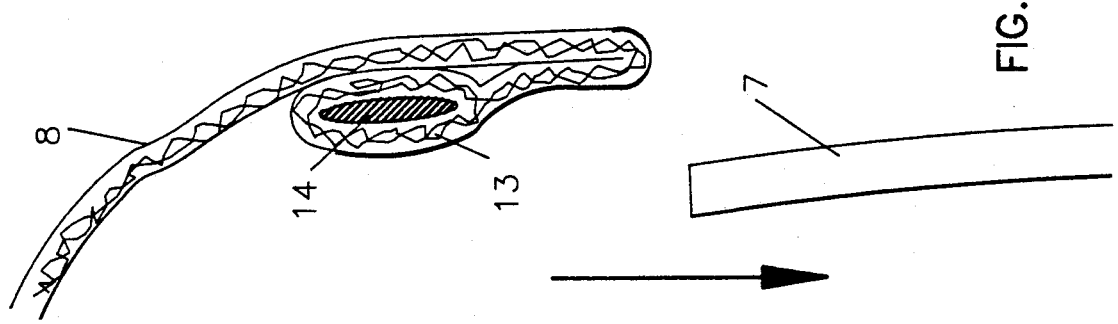
FIG. 5D
FIG. 5C
FIG. 5A
FIG. 5B

T-TOP ROOF COVER

TECHNICAL FIELD OF THE INVENTION

The present invention's most important application is replacing cumbersome glass roof panels used in automobiles with a T-top roof design.

BACKGROUND OF THE INVENTION

Currently, a number of automobiles utilize a T-top roof design, which has large openings on either side of the roof of the automobile which may be closed using removable glass roof panels which fit into the three sided opening formed by the frame of the upper edges of the front and rear windows and a central longitudinal support (the T-bar). These glass roof panels are heavy and are awkward to manage and to store, particularly in a smaller car. Conventional convertible top designs, generally utilizing tension lever mechanisms and/or tracks are not appropriate for T-top cars, because a design is needed which does not impair the existing front and rear window frame and the T-bar.

Conventional designs for sun roof covers require a side support which does not exist in a T-top automobile. Previous efforts to replace the glass panels in T-tops with a non-rigid material have proven impractical and have not been commercially viable, primarily because they involve substantial modifications to the existing cars, do not provide an adequate seal against wind and rain, are unattractive, and/or are too expensive. Despite the long-felt need for such a roof cover for T-top cars, no one up until now has designed a practical alternative for the glass roof panels.

This invention consists of a durable and attractive roof covering which can be easily and quickly attached and removed, which does not require major modifications to an existing automobile for installation, which provides an effective seal against wind and rain, which can be easily stored in a small area when not in use, and which does not detract from the appearance of the automobile.

SUMMARY OF THE INVENTION

The T-top roof cover of this patent consists of a more or less rectangular piece of flexible material (preferably sports topping canvas), with a gasket running along the front of the roof and along the drivers' and passengers' windows to act as a seal against wind and water. The covering is attached to the car by means of snaps, or other secure means.

A BRIEF DESCRIPTION OF THE DRAWINGS

FIG. 1 depicts a typical T-top of an automobile before it is modified to accommodate the instant invention, showing the metal portion of the roof of the car (1), the windshield molding (2), the metal front corner support (3) which comes in contact with the windshield and the side window (7), the side window (7), the metal side window support (5), the rear window molding (4), and the rear side window molding (6).

Figure 3B:
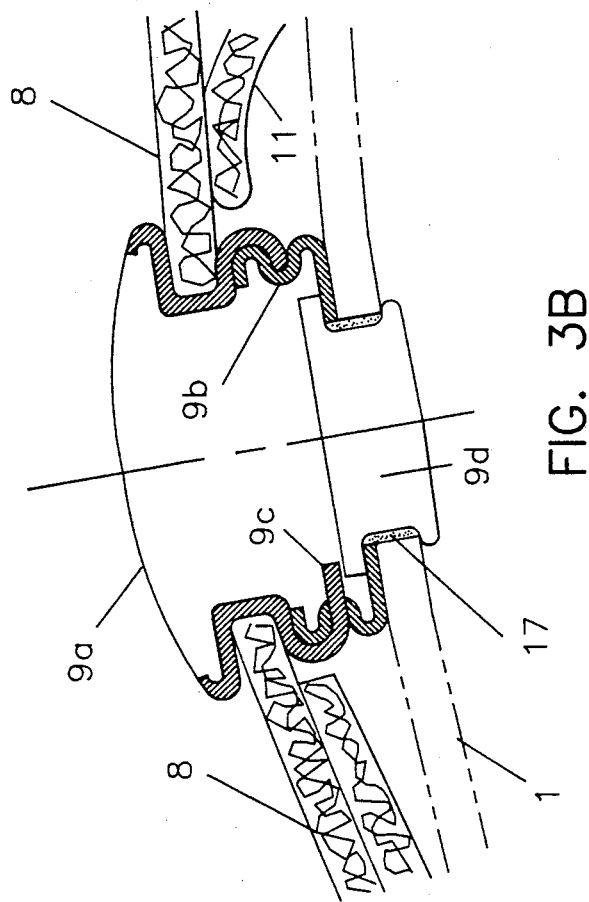
FIGS. 3A through 3D show a cross section of different means of attachment along the front edge.
Figure 3A:
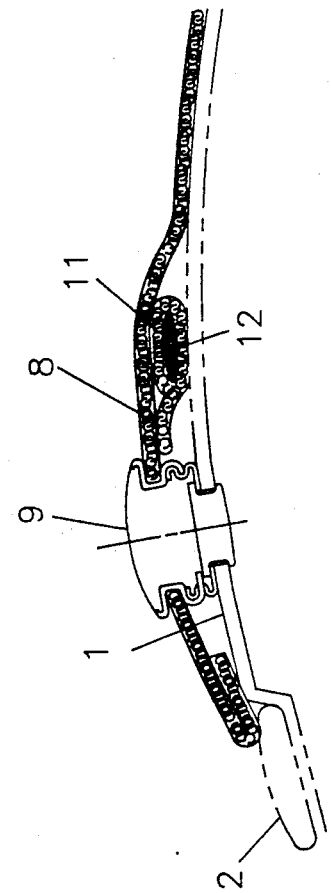

FIG. 3A shows a cross section of a snap, with the female portion of the snap (9) attached to the T-top roof cover (8), and the male portion of the snap attached to the metal roof of the car (1) near the windshield molding (2). FIG. 3A also shows a cross section of the gasket running along the front and side edges of the T-top roof cover, consisting of a piece of material (11) attached to the T-top roof cover (8) and surrounding a core of foam rubber or other flexible material (12).

FIG. 3B shows a more detailed view of the snap attachment of 3A, showing the top or female portion of the snap (9A) which interlocks with the bottom or male portion of the snap (9B), with a tab (9C) attached to the female portion of the snap (9A) to prevent the snap from being unfastened by the wind, and also showing the manner in which the male portion of the snap (9B) is held in place by means of a rivet (9D) with a silicone seal (17).

Figure 3C:
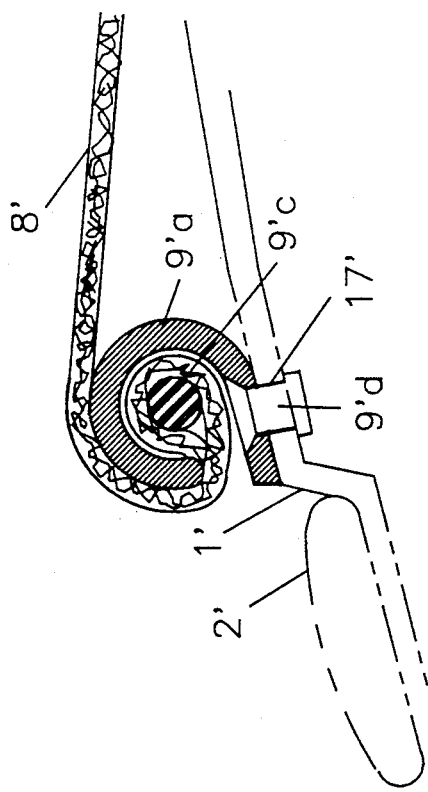

FIG. 3C depicts an alternative means of attaching the T-top cover (8'), by placing a core of rubber or other elastic materials (9'C) in the hem of the T-top roof cover (8'), so that it can be stretched and snapped in place by hooking the elasticized hem into a transverse metal or plastic grove piece (9'A) anchored by means of rivets (9'D) to the metal portion of the roof of the car (1') near the windshield molding (2').

Figure 3D:
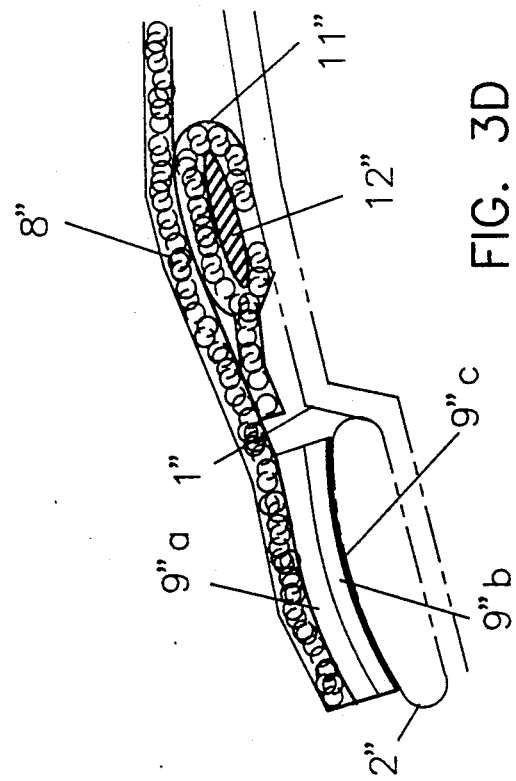

FIG. 3D depicts a third method of attachment for the T-top roof cover (8"), by means of complimentary VELCRO type hook and loop fastener strips (9"a) and (9"b) running along the forward edge of the T-top roof cover (8") and the windshield molding (2"), anchored in place by glue or other means (9"C) which will not disturb the integrity of the glass windshield.

FIGS. 4A through 4D depict the means of attachment at the rear edge of the T-top roof cover, and corresponds to FIGS. 3A through 3D.

FIG. 4A depicts a snap (10), the female portion of which is attached to the T-top roof cover (8), and the male portion of which is attached to the rear window molding (4).

FIG. 4B is a close up of FIG. 4A, depicting the snap having a female portion (10A) attached to the T-top roof cover (8), a male portion (10B) attached to the upper edge of the rear door or hatchback (4) by means of a rivet (9C) with a silicone seal (17).

FIG. 4C depicts the method of attachment of the T-top roof cover whereby the T-top roof cover (8') is held in place with an elastic band (10'C) hemmed into the edge of the roof cover (10'A), and snapped into a grooved piece (10'B) attached to the rear window molding (4") by means of a rivet (10"B) sealed by a washer (17').

FIG. 4D depicts the velcro means of attachment, showing the two complimentary strips of velcro (8"A and 8"B) attached by means of glue or other material (10"C) to the rear window molding (4").

FIGS. 5A through 5D depict the sides of the various type of T-top roof covers, showing the way in which the roof cover (8) forms a seal with the side window (7). FIGS. 5A and 5D correspond to FIGS. 3A and 3D, and show the T-top cover (8) with the gasket (14) hemmed into the side edge (13). FIG. 5C corresponds to FIG. 3C, and it shows the elastic core (10'C) utilized in that design. FIG. 5B shows the way in which the roof cover (8) comes down to form a seal with the window (7).

Figure 6:
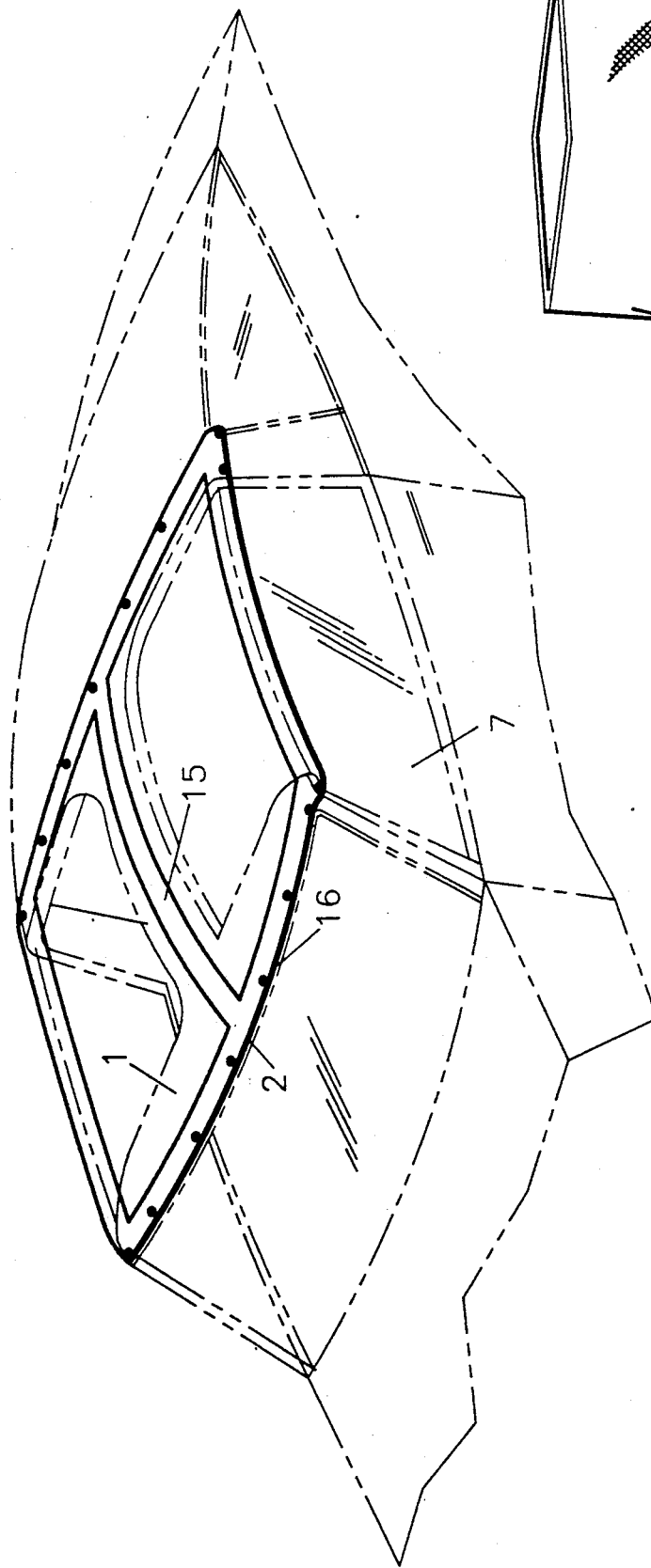

FIG. 6 depicts a template (15), which may be placed on the car to aid in drilling holes for the snaps or other fastening devices at the appropriate points (16) through the metal portion of the car roof (1).

Figure 7:
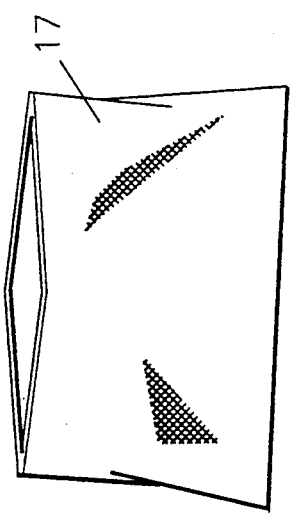

FIG. 7 depicts a bag or container (17) for holding the T-top roof cover when not in use.

DESCRIPTION OF PREFERRED FORMS OF THE INVENTION

There are essentially three preferred forms of the invention which differ simply in the means by which the invention is attached to the car. The elements which all forms of the invention have in common are that the points of attachment are along the front and rear edges of the T-top roof cover and at the front and rear corners of the roof cover. The roof cover attaches to metal or plastic portions of the car, rather than to the windows. In the preferred form of the invention, the roof cover is made of a durable, waterproof material such as sports topping canvas, which is the material generally used in convertible tops.

The first preferred form of the invention, depicted in FIGS. 2, 3A, 3B, 4A, 4B, 5A, and 5B, utilizes snaps to anchor the roof cover. The snaps are located along the front and rear edges of the roof cover, and also at the corners, to prevent flapping and permit a good seal with the side windows. In the preferred form of the invention, the snaps along the front edge of the roof cover are "pull the dot" snaps which contain tabs to prevent the wind from unsnapping the snaps when the automobile is in use. The rear snaps in the preferred form of the invention are ordinary glove snaps. The female portion of the snaps are attached to the roof cover, and the male portion of the snaps are attached to the metal portions of the car by means of rivets sealed with silicone. A foam rubber gasket along the edges of the cover helps prevent wind and rain from leaking under the top.

A template for drilling the necessary holes for attaching the snaps on an existing car is shown in FIG. 6.

The second preferred form of the invention, depicted in FIGS. 3C, 4C, and 5C, utilizes an elastic band hemmed into the circumference of the roof cover and snapped into grooved transverse pieces anchored at the front and rear of the car by means of rivets. Unlike the other forms of the invention, this form does not require a gasket to prevent air and water from coming under the roof cover.

Figure 1:
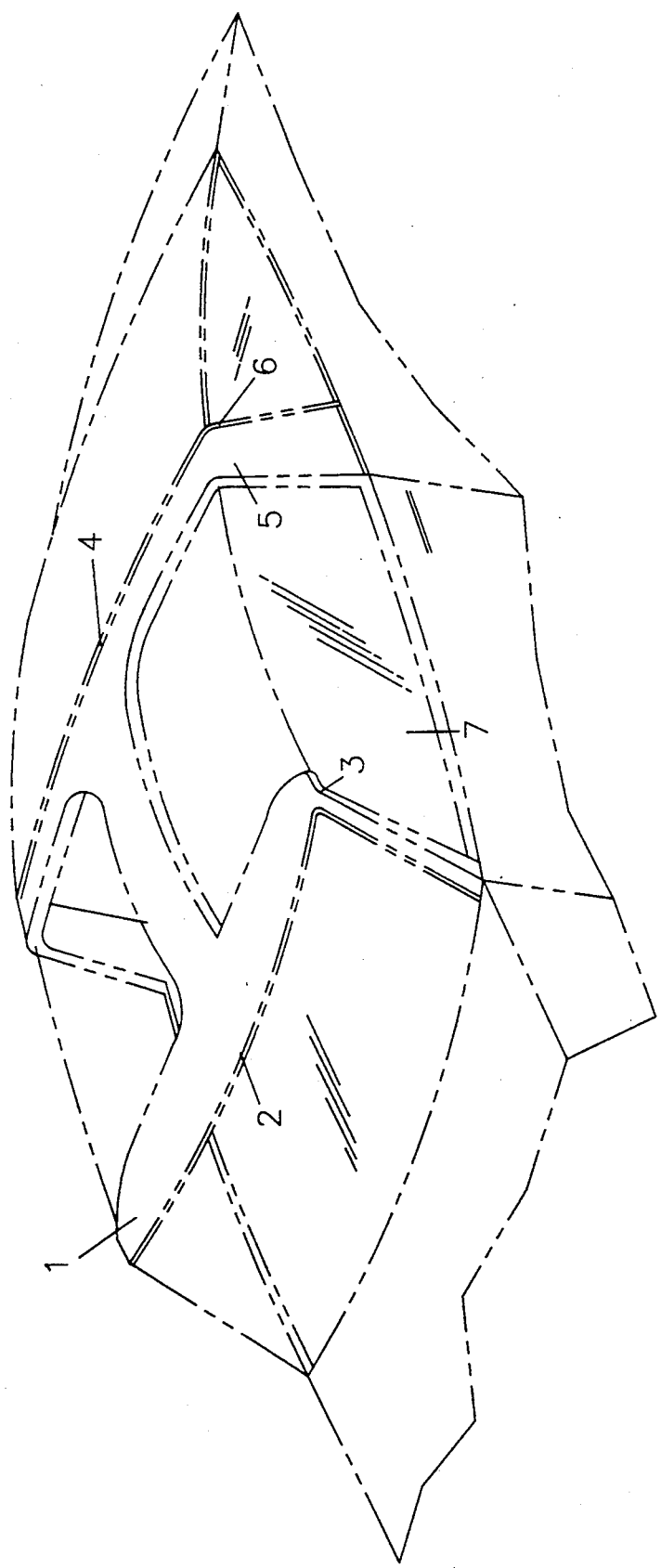
Figure 2:
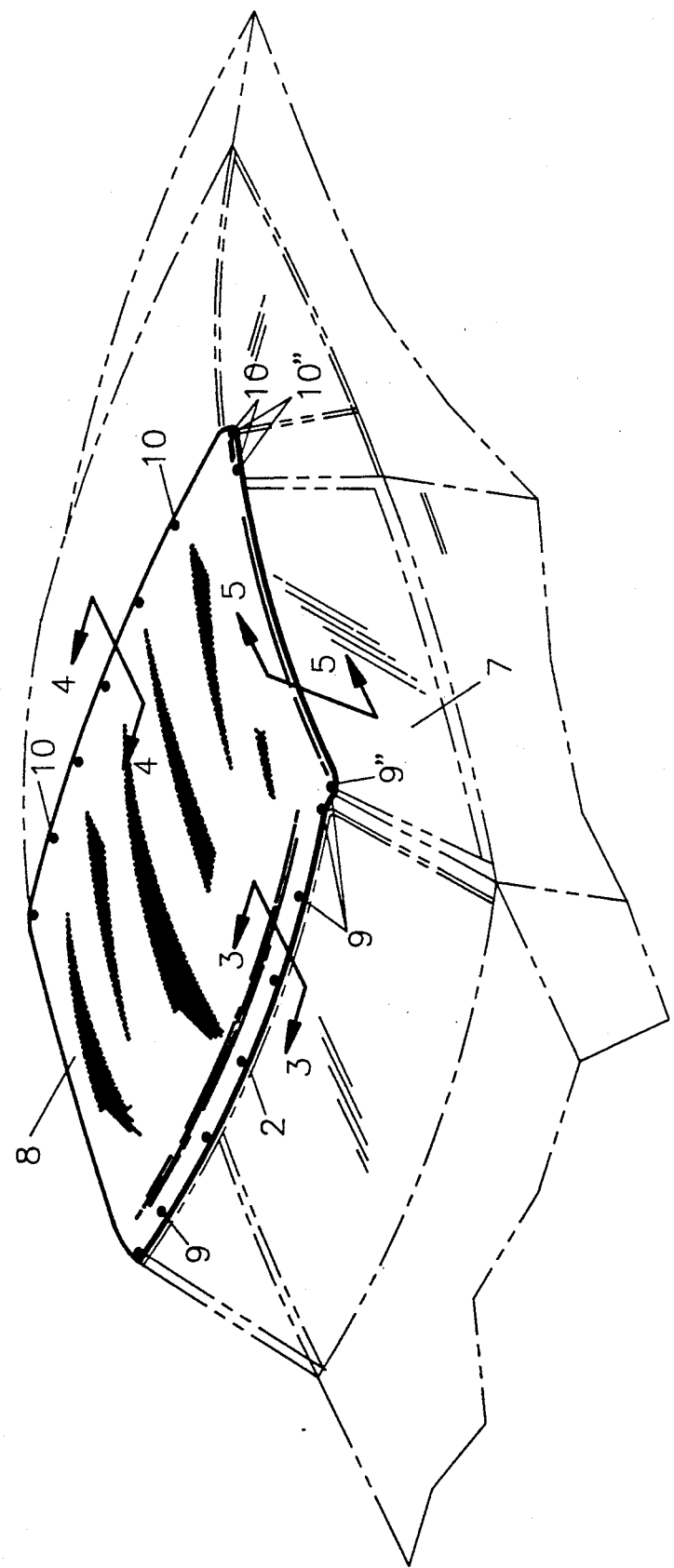
FIG. 2 depicts the same vehicle as FIG. 1 with the T-top roof cover (8) installed and attached, showing points of attachment along the front edge (9), the front corner (9"), the rear corner (10") and the rear edge (10).

The third preferred form of the invention, depicted in FIGS. 3D, 4D, and 5D, utilizes VELCRO type hook and loop fastener strips along the top edges of the front and rear window moldings to anchor the roof cover. Snaps, as shown in FIG. 2 at 9" and 10", are used at the corners to ensure a snug seal along the sides. The foam gasket is used along the side edges of the cover, but is not necessary along the front and rear edges of the cover.

Means of attachment other than those described above may be used, and minor variations in the invention as described may be implemented without altering the essential character of the invention. The foregoing description is provided by way of illustration and not by way of limitation.

I claim:

1. A removable cover for automobiles with a T-top roof comprising:
   (a) a cover made of flexible, waterproof material which is large enough to cover the roof area of an automobile having a T-top roof, front, rear and side windows, which cover has a front edge, a rear edge, two side edges, and four areas between the front and side edges and rear and side edges;
   (b) means of attachment by which the cover may be attached to and removed from the frame of the automobile;
   (c) means adjacent the side edges of the cover engageable with the side windows to establish a seal along the side windows, and means adjacent the front edge of the cover to establish a seal along the frame adjacent the front window; and
   (d) wherein said means of attachment includes a fastener means at each of said four areas of said cover for securing the cover to an exterior surface of the automobile at a level below an upper edge of the side windows.

2. The removable cover of claim 1 wherein (a) the means of attachment is a multiplicity of snaps, each with a male and female portion, the female portion of which snaps are attached to the front and rear edges and said four areas of the cover and the male portion of which snaps are mounted on the frame of the automobile so that the female and male portions of the snaps can be joined, thereby attaching the cover; and (b) which cover utilizes flexible gaskets attached adjacent the front and side edges of the cover to be engageable with the frame at the front window and the side windows.

3. The removable cover of claim 1 wherein (a) the means of attachment consists of two pair of complimentary strips of fabric which stick to each other, such as Velcro type hook and loop fastener strips, one half of one pair being mounted on the frame of the automobile along the front window and one half of the other pair being mounted along the rear window, with the other half of each pair being attached to the front and rear edges of the cover respectively, and four or more snaps, each with a male and female portion, wherein the female portion of at least one snap is attached to each of said areas of the cover, and the male portion of each snap is mounted at points on the frame of the automobile so that the female and male portions of the snaps can be joined thereby attaching the cover; and (b) which cover utilizes flexible gaskets attached adjacent the side edges of the cover to be engageable with the side windows of the automobile to establish the seal.

4. A removable cover for an automobile having a T-top roof area with openings therein, front, rear and side windows, and a frame supporting the front window and the rear window, the cover comprising in combination:
   (a) a layer of flexible, waterproof material dimensioned to cover the roof area and openings therein, said cover having a front edge, a rear edge, and opposite side edges;
   (b) means of attachment by which the cover may be attached to and removed from the frame of the automobile to close said openings in the roof area; and
   (c) means inwardly of the front edge and means adjacent the opposite side edges of the cover respectively engageable with the frame at the front window and the side windows of the associated automobile for establishing a seal to prevent entry of environmental elements under the cover when installed; and
   (d) wherein said means of attachment includes a plurality of fastener elements adjacent the front edge of the cover to be engageable with fastener elements on an exterior surface of the frame, said fastener elements on the cover each having opposite front and rear portions, the front portion being such that it must be fastened to the frame prior to the rear portion.

5. The cover defined in claim 4 wherein said means of attachment includes interengageable male and female snaps one of which has a portion extendible through an opening in a wall of the other.

6. The cover defined in claim 4 wherein said fastener elements are female snap elements, and said front portion is a tab projecting toward said rear portion.

7. The cover defined in claim 4 wherein said means of attachment includes fastener elements located adjacent opposite ends of the side edges of the cover to be engageable with the frame at a level below upper edges of the side windows.

8. The cover defined in claim 4 wherein said fastener elements are located between the front edge of the cover and said means inwardly of the front edge and engageable with the frame.

9. In combination with an automobile having a body including a roof area with openings therein, a windshield, a rear window opposite the windshield, and opposite side windows; a removable cover for closing both openings in the roof area, the cover comprising in combination a layer of flexible waterproof material dimensioned to cover and close both openings in the roof area, means removeably attaching the cover to the body to close said openings, said cover having opposite side edges and means adjacent to the side edges engageable with the side windows for establishing a seal along the windows to prevent entry of environmental elements into the automobile through a space between the side windows and the cover, said means attaching the cover to the body including fastener means adjacent opposite ends of the side edges of the cover attachable to an exterior surface of the body at an elevation below upper edges of the side windows for establishing the seal along the windows.

10. The combination defined in claim 9 wherein said cover has a front edge adjacent the windshield and seal means adjacent the front edge of the cover for sealing the cover to the body to present entry of environmental elements into the automobile below the front edge of the cover.

11. The combination defined in claim 10 wherein said means removably attaching the cover to the body of the automobile includes male and female snaps positioned between the front edge of the cover and said seal means adjacent the front edge of the cover, said female snap being located on said cover and having a forward portion and an opposite rear portion, said forward portion being engageable with an associated male snap prior to engagement of the rear portion with the male snap.

12. The combination defined in claim 9 wherein the said edges of the cover extend downwardly from the cover to be engageable along the opposite sides of the side windows.

13. The combination defined in claim 12 wherein said means on the opposite side edges of the cover includes an enlarged sealing portion extending along the opposite side edges of the cover and engageable with the side window.

14. The combination defined in claim 13 wherein the side edges of the cover have hem portions enclosing elongated flexible members.

15. In combination with an automobile having a T-top roof including a frame, front, rear and side windows, and grooved pieces mounted on the frame of the automobile adjacent the front and rear windows, a cover made of flexible, waterproof material large enough to cover the roof area of the automobile, said cover having a front edge, a rear edge, and two side edges, means of attachment by which the cover may be attached to and removed from the frame of the automobile, means adjacent the side edges of the cover engageable with the side windows to establish a seal along the side windows, and means adjacent the front edge of the cover to establish a seal along the frame adjacent the front window and wherein the means of attachment is an elastic band attached to the front and rear edges of the cover and capable of being stretched and snapped into grooved pieces mounted on the frame near the front and rear windows.

* * * * *